(12) United States Patent
Tsutsui

(10) Patent No.: US 10,395,669 B2
(45) Date of Patent: Aug. 27, 2019

(54) VOICE ANALYSIS APPARATUS, VOICE ANALYSIS METHOD, AND PROGRAM

(71) Applicant: SONY INTERACTIVE ENTERTAINMENT INC., Tokyo (JP)

(72) Inventor: Kyoya Tsutsui, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/076,937

(22) PCT Filed: Feb. 10, 2017

(86) PCT No.: PCT/JP2017/004876
§ 371 (c)(1),
(2) Date: Aug. 9, 2018

(87) PCT Pub. No.: WO2017/145800
PCT Pub. Date: Aug. 31, 2017

(65) Prior Publication Data
US 2019/0051316 A1 Feb. 14, 2019

(30) Foreign Application Priority Data
Feb. 25, 2016 (JP) .................. 2016-033842

(51) Int. Cl.
*G10L 19/00* (2013.01)
*G10L 25/51* (2013.01)
(Continued)

(52) U.S. Cl.
CPC ............... *G10L 25/51* (2013.01); *G10G 1/00* (2013.01); *G10H 1/00* (2013.01); *G10L 19/02* (2013.01);
(Continued)

(58) Field of Classification Search
CPC combination set(s) only.
See application file for complete search history.

(56) References Cited

U.S. PATENT DOCUMENTS 7,923,621 B2 * 4/2011 Shiraishi .................. G10H 1/40
700/94

FOREIGN PATENT DOCUMENTS

JP 2005-274708 A 10/2005
JP 2008-102405 A 5/2008
(Continued)

OTHER PUBLICATIONS

International Preliminary Report on Patentability dated Sep. 7, 2018, from International Application No. PCT/JP2017/004876, 6 sheets.
(Continued)

*Primary Examiner* — Vu B Hang
(74) *Attorney, Agent, or Firm* — Katten Muchin Rosenman LLP

(57) ABSTRACT

Provided are a voice analysis apparatus, a voice analysis method, and a program that enable a steady tendency of a beat cycle to be specified with high accuracy. A sound volume correlation value calculation section (48) calculates, for each of a plurality of time intervals, a value indicating a degree of correlation in a sound volume of voices at two or more timings separated by the time interval, as a sound volume correlation value associated with the time interval. A beat cycle specification section (50) specifies the beat cycle of the voices on the basis of the sound volume correlation value associated with each of the plurality of time intervals.

6 Claims, 5 Drawing Sheets

(51) Int. Cl.
*G10L 19/02* (2013.01)
*G10G 1/00* (2006.01)
*G10H 1/00* (2006.01)
*G10L 25/48* (2013.01)
*G10L 15/02* (2006.01)
*G10L 25/06* (2013.01)

(52) U.S. Cl.
CPC .............. *G10L 25/48* (2013.01); *G10L 15/02* (2013.01); *G10L 25/06* (2013.01)

(56) References Cited

FOREIGN PATENT DOCUMENTS

JP     2011-095509 A     5/2011
JP     2015-40970 A     3/2015

OTHER PUBLICATIONS

International Search Report and Written Opinion dated Apr. 25, 2017, from International Application No. PCT/JP2017/004876, 6 sheets.

\* cited by examiner

VOICE ANALYSIS APPARATUS, VOICE ANALYSIS METHOD, AND PROGRAM

TECHNICAL FIELD

The present invention relates to a voice analysis apparatus, a voice analysis method, and a program.

BACKGROUND ART

A voice analysis technology for analyzing characteristics of voices such as a pitch, an intensity, or a beat has been known. As an example of this voice analysis technology, for example, in PTL 1, a technology for obtaining a signal component of each pitch in a voice signal has been described. Further, for example, in PTL 2, a technology for determining a root of a chord on the basis of voice signals has been described. In addition, a technology for specifying as a beat an attack portion in which a sound volume changes rapidly has also been known.

CITATION LIST

Patent Literature

[PTL 1]
JP 2005-274708A
[PTL 2]
JP 2008-102405A

SUMMARY

Technical Problem

In a technology for specifying as a beat an attack portion in which the sound volume changes rapidly, the beat is specified on the basis of a change in a local sound volume, and therefore the above technology is not very suitable at the time at which a steady tendency of a beat cycle is specified.

In view of the foregoing, it is an object of the present invention to provide a voice analysis apparatus, a voice analysis method, and a program that enable a steady tendency of a beat cycle to be specified with high accuracy.

Solution to Problem

In order to solve the problem described above, a voice analysis apparatus includes: a sound volume correlation value calculation section configured to calculate, for each of a plurality of time intervals, a value indicating a degree of correlation in a sound volume of voices at two or more timings separated by the time interval, as a sound volume correlation value associated with the time interval; and a beat cycle specification section configured to specify a beat cycle of the voices on the basis of the sound volume correlation value associated with each of the plurality of time intervals.

In one mode of the present invention, the sound volume correlation value calculation section calculates a representative value of the value indicating the degree of the correlation in the sound volume of the voices at the two or more timings separated by the time interval, which is calculated for each of a plurality of timings and includes the timing, as the sound volume correlation value associated with the time interval.

Further, in another mode of the present invention, the voice analysis apparatus further includes a beat timing specification section configured to calculate, for each of the plurality of timings, the value indicating the degree of the correlation in the sound volume of the voices at the two or more timings separated by the beat cycle, which includes the timing and the sound volume of the voices at the timing, and specify a beat timing of the voices on the basis of the calculated value.

Further, in another mode of the present invention, the voice analysis apparatus further includes a rhythmic beat-number specification section configured to specify, for each of a plurality of integers, the sound volume correlation value associated with the time interval that is the integer multiple of the beat cycle and specify a rhythmic beat-number of the voices on the basis of the specified sound volume correlation value.

Further, in another mode of the present invention, the voice analysis apparatus further includes: a beat timing specification section configured to calculate, for each of the plurality of timings, the value indicating the degree of the correlation in the sound volume of the voices at the two or more timings separated by the beat cycle, which includes the timing and the sound volume of the voices at the timing, and specify a beat timing of the voices on the basis of the calculated value; a rhythmic beat-number specification section configured to specify, for each of a plurality of integers, the sound volume correlation value associated with the time interval that is the integer multiple of the beat cycle and specify a rhythmic beat-number of the voices on the basis of the calculated sound volume correlation value; and a measure start timing specification section configured to specify a measure start timing of the voices on the basis of the specified beat timing and the specified rhythmic beat-number.

Further, a voice analysis method according to the present invention includes: a step of calculating, for each of a plurality of time intervals, a value indicating a degree of correlation in a sound volume of voices at two or more timings separated by the time interval, as a sound volume correlation value associated with the time interval; and a step of specifying a beat cycle of the voices on the basis of the sound volume correlation value associated with each of the plurality of time intervals.

Further, a program according to the present invention for causing a computer to execute: a procedure for calculating, for each of a plurality of time intervals, a value indicating a degree of correlation in a sound volume of voices at two or more timings separated by the time interval, as a sound volume correlation value associated with the time interval; and a procedure for specifying a beat cycle of the voices on the basis of the sound volume correlation value associated with each of the plurality of time intervals.

DESCRIPTION OF EMBODIMENT

Hereinafter, an embodiment of the present invention will be described with reference to the accompanying drawings.

Figure 1:
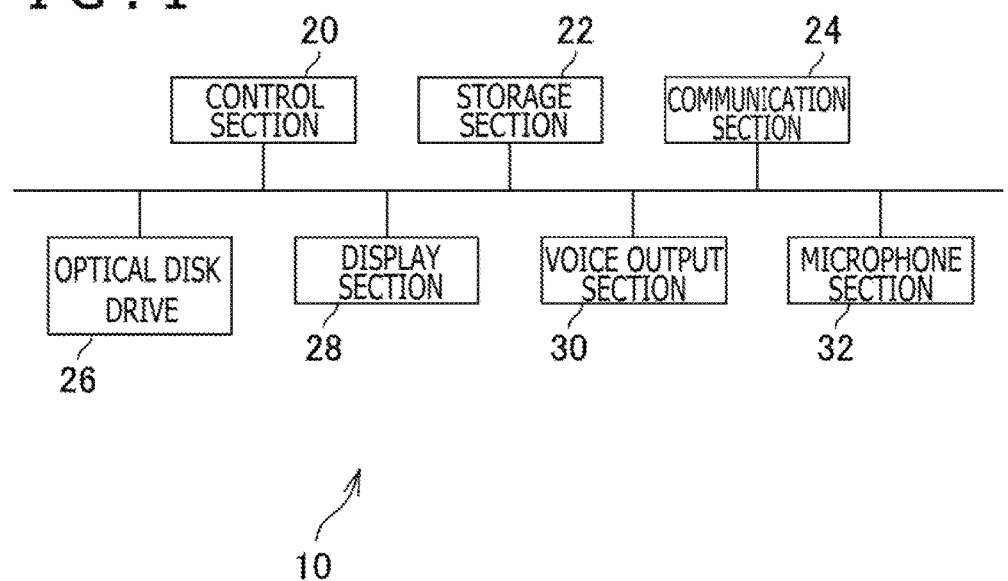
FIG. 1 is a diagram illustrating an example of a configuration of a voice analysis apparatus according to an embodiment of the present invention.

FIG. 1 is a diagram illustrating an example of a configuration of a voice analysis apparatus 10 according to an embodiment of the present invention. The voice analysis apparatus 10 according to the present embodiment is a computer such as a personal computer, a server computer, a game console, a portable game machine, a smartphone, or a tablet terminal. As illustrated in FIG. 1, for example, the voice analysis apparatus 10 according to the present embodiment includes a control section 20, a storage section 22, a communication section 24, an optical disk drive 26, a display section 28, a voice output section 30, and a microphone section 32.

The control section 20 is, for example, a program control device such as a central processing unit (CPU) that operates in accordance with a program installed in the voice analysis apparatus 10.

The storage section 22 is, for example, a memory element such as a read-only memory (ROM) or random access memory (RAM), a hard disk drive, or the like. In the storage section 22, a program or the like to be executed by the control section 20 is stored.

The communication section 24 is a communication interface such as a network board or a wireless local area network (LAN) module.

The optical disk drive 26 is a readable device of a program or data recorded in an optical disk such as a digital versatile disc (DVD)-ROM or a Blu-ray (registered trademark) disk.

The display section 28 is, for example, a liquid crystal display or the like and displays videos or the like expressed by a video signal which the voice analysis apparatus 10 generates.

The voice output section 30 is, for example, headphones, a speaker, or the like and outputs voices or the like expressed by voice data such as a PCM (Pulse Code Modulation) sound source.

The microphone section 32 is, for example, a device that acquires an ambient voice, converts the voice to voice data, and outputs the voice data to the control section 20.

The voice analysis apparatus 10 according to the present embodiment analyzes voice data of voices such as music and specifies estimation results of a beat cycle of the voices, a timing of a beat, a rhythmic beat-number, and a measure start timing.

The voice data to be analyzed may be, for example, voice data of the PCM (Pulse Code Modulation) sound source or the like, which is stored in the storage section 22 or an optical disk read by the optical disk drive 26. Further, voice data that is distributed by streaming from a server capable of communication through the communication section 24 may be analyzed. In addition, voice data generated from voices which the microphone section 32 acquires may be analyzed.

Further, the voice analysis apparatus 10 may generate video data of an animation or the like on the basis of a beat cycle, a beat timing, a rhythmic beat-number, and a measure start timing specified as the estimation results. For example, the voice analysis apparatus 10 may generate video data in which characters dance to the music expressed by the voice data to be analyzed. In addition, in a case in which the voice expressed by the voice data to be analyzed is reproduced and output, videos expressed by the generated video data may also be reproduced and output together. At this time, videos matching with voices to be reproduced and output, for example, videos of characters who dance to the reproduced and output music may be displayed.

Further, for example, in a case in which the voice expressed by the voice data to be analyzed is reproduced and output, for example, voices of hand-clapping or the like may be output by voices together, for example, at the timing specified as the beat timing.

Further, the voice analysis apparatus 10 may analyze a certain length of voice data such as one cut of music stored in the storage section 22 or recorded in an optical disk read by the optical disk drive 26. Further, the voice analysis apparatus 10 may analyze the voice data in real time while reproducing and outputting voices expressed by the voice data distributed by streaming or voices expressed by the voice data generated from voices acquired by the microphone section 32.

Hereinafter, functions of the voice analysis apparatus 10 according to the present embodiment and processes executed by the voice analysis apparatus 10 according to the present embodiment will be further described.

Figure 2:
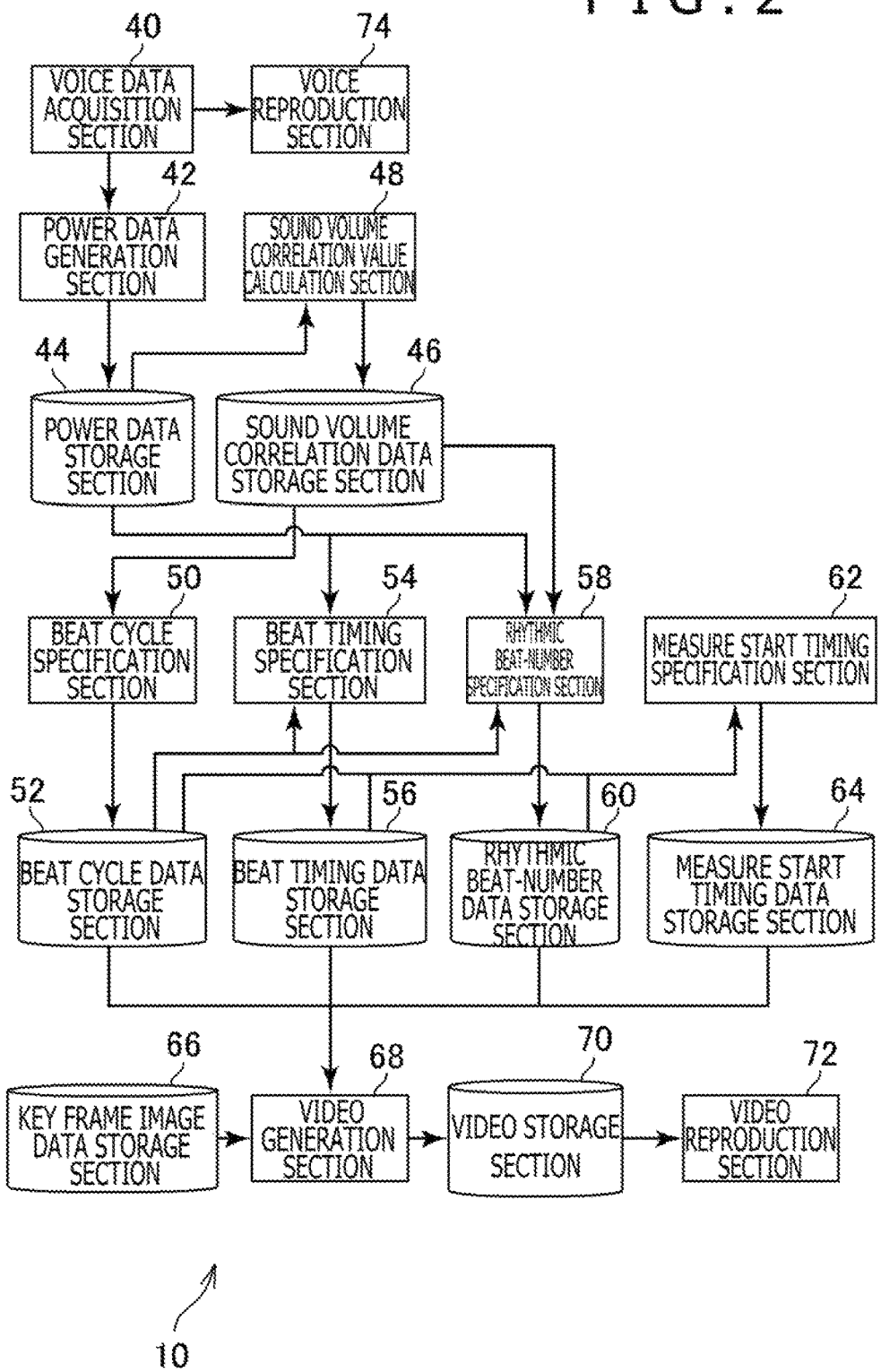
FIG. 2 is a functional block diagram illustrating an example of functions implemented by the voice analysis apparatus according to the embodiment of the present invention.

FIG. 2 is a functional block diagram illustrating an example of the functions implemented by the voice analysis apparatus 10 according to the present embodiment. It is to be noted that in the voice analysis apparatus 10 according to the present embodiment, all of the functions illustrated in FIG. 2 need not be implemented and any function except the functions illustrated in FIG. 2 may be implemented.

As illustrated in FIG. 2, the voice analysis apparatus 10 according to the present embodiment functionally includes, for example, a voice data acquisition section 40, a power data generation section 42, a power data storage section 44, a sound volume correlation data storage section 46, a sound volume correlation value calculation section 48, a beat cycle specification section 50, a beat cycle data storage section 52, a beat timing specification section 54, a beat timing data storage section 56, a rhythmic beat-number specification section 58, a rhythmic beat-number data storage section 60, a measure start timing specification section 62, a measure start timing data storage section 64, a key frame image data storage section 66, a video generation section 68, a video storage section 70, a video reproduction section 72, and a voice reproduction section 74.

The voice data acquisition section 40, the power data generation section 42, the sound volume correlation value calculation section 48, the beat cycle specification section 50, the beat timing specification section 54, the rhythmic beat-number specification section 58, the measure start timing specification section 62, and the video generation section 68 are primarily implemented as the control section 20. The power data storage section 44, the sound volume correlation data storage section 46, the beat cycle data storage section 52, the beat timing data storage section 56, the rhythmic beat-number data storage section 60, the measure start timing data storage section 64, the key frame image data storage section 66, and the video storage section 70 are primarily implemented as the storage section 22. The video reproduction section 72 is primarily implemented as the control section 20 and the display section 28. The voice reproduction section 74 is primarily implemented as the control section 20 and the voice output section 30.

The above-described functions may be implemented by executing, using the control section 20, programs including instructions corresponding to the above-described functions, which are installed in the voice analysis apparatus 10 that is a computer. The programs may be supplied to the voice analysis apparatus 10 via a computer readable information storage medium such as an optical disk, a magnetic disk, a magnetic tape, a magnetic optical disk, or a flash memory, or through the Internet or the like.

In the present embodiment, for example, the voice data acquisition section 40 acquires the voice data to be analyzed. Here, the voice data acquisition section 40 may collectively acquire a certain length of voice data such as one cut of music stored in the storage section 22 or recorded in an optical disk read by the optical disk drive 26. Further, in a case in which an analysis of voices is performed in real time, the voice data acquisition section 40 may sequentially acquire, for example, a portion of the voice data corresponding to one cut of music or the like in accordance with the order of time. For example, the voice data acquisition section 40 may acquire the voice data whenever voice data corresponding to a portion of music is received, or whenever voice data corresponding to a portion of music is generated from voices acquired by the microphone section 32.

In the present embodiment, for example, on the basis of voice data which the voice data acquisition section 40 acquires, the power data generation section 42 generates power data indicating a sound volume of voices expressed by the voice data. Further, in the present embodiment, for example, the power data generation section 42 allows the power data storage section 44 to store the generated power data.

Figures 3, 4:
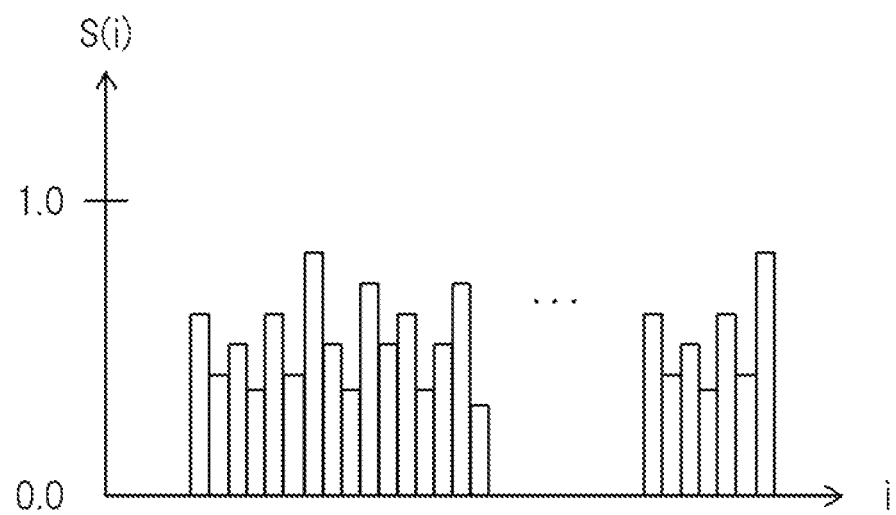
FIG. 3 is a diagram schematically illustrating an example of power data.
FIG. 4 is a diagram illustrating an example of sound volume correlation data.

In the present embodiment, for example, power data indicating the sound volume of voices in a predetermined time (for example, every five milliseconds), which is segmented in each predetermined time (for example, every five milliseconds), is generated. FIG. 3 is a diagram schematically illustrating an example of the power data. Hereinafter, an i-th predetermined time that is counted from the start of voices expressed by the voice data to be analyzed is assumed to be referred to as an i-th time block. As illustrated in FIG. 3, in the present embodiment, a value of power data of the i-th time block is assumed to be expressed as $S(i)$.

Note that the power data generation section 42 may generate the power data in real time. For example, the power data generation section 42 may specify a value of $S(i)$ in accordance with acquisition of the voice data of the i-th time block. Further, the power data generation section 42 may collectively generate power data regarding the voice expressed by a certain length of voice data such as one cut of music.

Here, for example, a value of average power $S1(i)$ of voices expressed by the voice data of the i-th time block may be specified as a value of $S(i)$. $S1(i)$ indicates an average sound volume of the voices of the i-th time block.

Further, for example, a difference $S2(i)$ between the average power $S1(i)$ of the voices expressed by the voice data of the i-th time block and average power $S1(i-1)$ of the voices expressed by the voice data of the (i-1)-th time block may be specified as an intensity of the sound volume $S(i)$. $S2(i)$ indicates a relative sound volume of voices of the i-th time block in a case in which being compared with the sound volume of voices of the (i-1)-th time block.

Further, a value of weighted average $S3(i)$ of the above-described $S1(i)$ and $S2(i)$ may be specified as a value of $S(i)$. Further, a value $S4(i)$ obtained by raising a value of $S3(i)$ to the r-th power ($r \leq 1.0$) may be specified as a value of $S(i)$. In $S4(i)$, $S3(i)$ as a great value is emphasized. Further, weighted average $S5(i)$ of a value $S4(j)$ regarding several values j including i may be specified as a value of $S(i)$. In $S5(i)$, a temporal fluctuation is reduced as compared with $S4(i)$.

Further, power data may be generated on the basis of data obtained by passing through a high-frequency pass filter with respect to the voice data which the voice data acquisition section 40 acquires. This permits a value $S(i)$ regarding an attack portion to be emphasized. Further, data obtained by processing the voice data which the voice data acquisition section 40 acquires may be treated as $S(i)$ by using the above-described $S1(i)$ to $S5(i)$.

In the present embodiment, for example, the power data storage section 44 stores the power data generated by the power data generation section 42.

In the present embodiment, for example, the sound volume correlation data storage section 46 stores the sound volume correlation value indicating a degree of correlation of the sound volume of voices at two or more timings separated by a certain time interval. For example, sound volume correlation data indicating sound volume correlation values to be calculated regarding each of a plurality of respective time intervals is stored in the sound volume correlation data storage section 46. FIG. 4 is a diagram illustrating an example of the sound volume correlation data. As illustrated in FIG. 4, sound volume correlation values $R(P)$ (P is an integer greater than or equal to P0 and smaller than or equal to P1) associated with respective time intervals are set to the sound volume correlation data. P corresponds to an interval of the time block. For example, the sound volume correlation value $R(P)$ indicates the degree of correlation in the sound volume of voices at two or more timings separated by P pieces of time blocks.

Further, as described below, in the present embodiment, in the plurality of respective timings, a part sound volume correlation value indicating the degree of correlation in the sound volume of voices at two or more timings separated by the P pieces of time blocks including the timings is calculated. Hereinafter, the part sound volume correlation value indicating the degree of the correlation of the sound volume of the voices at the two or more timings separated by the P pieces of time blocks including an n-th time block is assumed to be expressed as $R(n, P)$. In the present embodiment, the sound volume correlation value $R(P)$ indicates a representative value of the part sound volume correlation value $R(n, P)$ calculated regarding a plurality of time blocks.

Note that in the present embodiment, any of the sound volume correlation values $R(P0)$, $R(P0+1)$, $R(P1)$ in an initial state are assumed to be 0.

In the present embodiment, for example, the sound volume correlation value calculation section 48 calculates the above-described sound volume correlation values in the plurality of respective time intervals. Here, for example, in accordance with generation of the power data in the n-th time block, the above-described part sound volume correlation value $R(n, P)$ is assumed to be calculated in respective integers P greater than or equal to P0 and smaller than or equal to P1. That is, values of $R(n, P0)$, $R(n, P0+1)$, $R(n, P1)$ are calculated in accordance with the generation of the power data regarding the n-th time block.

Here, for example, in integers from 1 to a given integer k1, a value calculated by totaling products of a value of S(n) and that of S(n−k1×P) may be calculated as the part sound volume correlation value R(n, P). In this case, for example, when any value of S(n), S(n−P), S(n−2P), ..., S(n−k1×P) are great, the part sound volume correlation value R(n, P) becomes great. Further, as a value of the given integer k1 is greater, the sound volume of voices in the past is more reflected on the part sound volume correlation value R(n, P).

In the present embodiment, the sound volume correlation value calculation section 48 updates the sound volume correlation value R(P) on the basis of the sound volume correlation value R(P) in the sound volume correlation data stored in the sound volume correlation data storage section 46 and the calculated part sound volume correlation value R(n, P). Here, for example, the sound volume correlation value R(P) is updated to a value calculated by using an expression $(1.0-w) \times R(P) + w \times R(n, P)$. That is, it may be said that the sound volume correlation value R(P) after the updating is weighted average of the sound volume correlation value R(P) before the updating and the latest part sound volume correlation value R(n, P). In this manner, in the present embodiment, the calculated latest part sound volume correlation value R(n, P) is reflected on the sound volume correlation value R(P). It is to be noted that w is a weighted coefficient greater than or equal to 0 and smaller than or equal to 1 and, as a value of w is greater, the latest part sound volume correlation value R(n, P) more exerts an influence on the sound volume correlation value R(P).

In the present embodiment, for example, the beat cycle specification section 50 specifies a beat cycle of voices on the basis of the sound volume correlation values associated with the plurality of respective time intervals. Here, any of the plurality of time intervals may be specified as the beat cycle of voices. For example, on the basis of the sound volume correlation value indicated by the sound volume correlation data stored in the sound volume correlation data storage section 46, the beat cycle specification section 50 specifies the beat cycle of voices expressed by the voice data to be analyzed. For example, in a case in which a maximum value among R(P0), R(P0+1), R(P1) is R(100), a value 100 is specified as a value Pb of the beat cycle. In this manner, in the present embodiment, the value Pb of the beat cycle to be specified is expressed by the number of the time blocks corresponding to the time interval of a beat. For example, in a case in which a length of the time block is 5 milliseconds and the value Pb of the beat cycle is 100, the value Pb of the beat cycle corresponds to 5 milliseconds×100=0.5 seconds if converted into time. Note that the time interval associated with a maximum sound volume correlation value R(P) need not be specified as the beat cycle. Further, on the basis of a value obtained by performing some sort of operation on R(P), which is not R(P) itself, the beat cycle may be specified.

Further, for example, the sound volume correlation value may be calculated for each time interval corresponding to the plurality of time blocks. Further, the beat cycle of voices may be specified on the basis of the time block associated with the maximum sound volume correlation value and the time block associated with the next maximum sound volume correlation value among the above sound volume correlation values. The sound volume correlation value may be calculated, for example, every ten time blocks. Here, in a case in which the maximum value is R(100) and the next maximum value is R(90) among the calculated sound volume correlation values, a value 95 that is an average of 100 and 90 may be calculated as the value Pb of the beat cycle.

In the present embodiment, in a steady tendency of the beat cycle, in a case in which the sound volume of voices becomes strong in each interval of Pb pieces of time blocks, the sound volume correlation value R(Pb) becomes great. Therefore, it may be said that the value Pb of the beat cycle specified as described above expresses the estimation result of the beat cycle of the voices to be analyzed. In this manner, according to the present embodiment, the steady tendency of the beat cycle can be specified with high accuracy.

In the present embodiment, for example, the beat cycle data storage section 52 stores beat cycle data indicating the beat cycle specified by the beat cycle specification section 50. In the present embodiment, for example, the beat cycle data to which the value Pb of the above-described beat cycle is set is stored in the beat cycle data storage section 52. In the present embodiment, the beat cycle specification section 50 updates the value Pb of the beat cycle data whenever the beat cycle is specified.

In the present embodiment, for example, the beat timing specification section 54 specifies the beat timing of voices expressed by the voice data to be analyzed. Regarding a plurality of respective timings, for example, the beat timing specification section 54 calculates a value indicating the degree of the correlation in the sound volume of voices at two or more timings separated by the specified beat cycle including the timing and the sound volume of voices at the timing.

For example, in accordance with the generation of the power data regarding the n-th time block, a beat timing evaluation value Z(h) is evaluated in respective integers h greater than or equal to 0 and smaller than Pb. Here, for example, in a given integer k2, a value calculated by totaling products of S(n−h) and S(n−h−k2×Pb) is calculated as the beat timing evaluation value Z(h). That is, in accordance with the generation of the power data regarding the n-th time block, Z(0), Z(1), ..., Z(Pb−1) are calculated. Here, as described above, S(n−h) is a value of power data of a (n−h)-th time block and S(n−h−k2×Pb) is a value of power data of the time block prior to the (n−h)-th time block by k2×Pb pieces. In this case, when any value of S(n−h), S(n−h−Pb), S(n−h−2Pb), ..., S(n−h−(Pb−1)) are great, the beat timing evaluation value Z(h) becomes great. Further, an influence that is exerted on the beat timing evaluation value Z(h) by a value of S(n−h) becomes greater than an influence that is exerted on the beat timing evaluation value Z(h) by values of S(n−h−Pb), S(n−h−2Pb), ..., S(n−h−(Pb−1)). In addition, as a value of the given integer k2 is greater, the sound volume of voices in the past is more reflected on the beat timing evaluation value Z(h). Note that the value Pb is, for example, a value of the beat cycle data stored in the beat cycle data storage section 52. Further, S(n−h) or S(n−h−k2×Pb) is specified on the basis of the power data stored in the power data storage section 44. Note that the given integer k2 may be same with or different from the above-described integer k1.

Then, the beat timing specification section 54 specifies the beat timing of voices on the basis of the beat timing evaluation value Z(h) calculated regarding a plurality of timings associated with respective integers greater than or equal to 0 and smaller than Pb. Here, any of the plurality of timings may be specified as the beat timing of voices. Here, for example, in a case in which n is 2000 and the maximum value among Z(0), Z(1), ..., Z(Pb−1) is Z(20), 1980 is specified as a value ta of the latest beat timing. In this manner, in the present embodiment, the value ta of the latest beat timing is expressed by the number of the time block. In addition, here, the time block expressed by the value ta of the latest beat timing and timing corresponding to the time block separated by an integer multiple of the beat cycle Pb specified from the value ta of the latest beat timing may be specified as the beat timing.

Note that a method for calculating Z(h) is not limited to the above-described method. Regarding the given integer k2, for example, a value obtained by totaling S(n−h−k2×Pb) may be calculated as the beat timing evaluation value Z(h). In addition, for example, the part sound volume correlation value corresponding to the time interval Pb may be used in place of a value of the power data. Concretely, for example, in the given integer k2, a value obtained by totaling products of R(n−h, Pb) and R(n−h−k2×Pb, Pb) may be calculated as the beat timing evaluation value Z(h).

Further, for example, the beat timing evaluation value may be calculated for each of the plurality of time blocks. Further, among the above beat timing evaluation values, on the basis of the time block associated with the maximum beat timing evaluation value and the time block associated with the next maximum beat timing evaluation value, the beat timing of voices may be specified. For example, the beat timing evaluation value may be calculated every ten time blocks. Here, in a case in which n is 2000 and the maximum value of the calculated beat timing evaluation value is Z(20) and the next maximum value of the beat timing evaluation value is Z(10), 1985(=2000−(20+10)/2) may be calculated as the value ta of the beat timing.

In the present embodiment, for example, the beat timing data storage section 56 stores beat timing data indicating the beat timing specified by the beat timing specification section 54. For example, the beat timing data to which the value ta of the latest beat timing is set is stored in the beat cycle data storage section 52. In the present embodiment, the beat timing specification section 54 updates the value ta of the beat timing data whenever the beat timing is specified.

In the present embodiment, when the sound volume of voices of the (n−h)-th time block or the sound volume of voices of the time block prior to the (n−h)-th time block by k2×Pb pieces is great, a value of Z(h) becomes great. Therefore, it may be said that the value ta of the latest beat timing specified as described above expresses an estimation result of the latest beat timing of the voices to be analyzed. In addition, it may be said that the time block prior to the value ta of the latest beat timing by an integer multiple of Pb also expresses the estimation result of the beat timing of voices to be analyzed.

In the present embodiment, for example, the rhythmic beat-number specification section 58 specifies a rhythmic beat-number N of voices expressed by the voice data to be analyzed. Regarding a plurality of respective integers, for example, the rhythmic beat-number specification section 58 specifies the sound volume correlation value associated with the time interval that is the integer multiple of the specified beat cycle Pb. Regarding respective integers m greater than or equal to 2 and smaller than or equal to 6, for example, the rhythmic beat-number specification section 58 specifies the sound volume correlation value R(m×Pb) indicated by the sound volume correlation data stored in the sound volume correlation data storage section 46. That is, for example, the rhythmic beat-number specification section 58 specifies R(2Pb), R(3Pb), . . . , R(6Pb). Here, for example, in a case in which the voice to be analyzed is music of four beats, a value of R(4Pb) is likely to be greater than other values among R(2Pb), R(3Pb), . . . , R(6Pb).

On the basis of the specified sound volume correlation value R(m×Pb), the rhythmic beat-number specification section 58 specifies the rhythmic beat-number N of the voice to be analyzed. Here, any of the plurality of integers m may be specified as the rhythmic beat-number N of the voice to be analyzed. For example, in a case in which the maximum value is R(4Pb) among R(2Pb), R(3Pb), . . . , R(6Pb), 4 is specified as the rhythmic beat-number N of the voice to be analyzed.

Note that in place of the sound volume correlation value R, a representative value of a plurality of sound volume correlation values R may be used. For example, a representative value of the sound volume correlation value in the time interval in which a difference between the sound volume correlation value in the time interval Pb and the value Pb is smaller than or equal to a predetermined value is assumed to be expressed as Ra(Pb). Examples of the value of Ra(Pb) include a value R(Pb−1), a value R(Pb), a value R(Pb+1), an average thereof, and the like. At this time, for example, in a case in which the maximum value is Ra(4Pb) among Ra(2Pb), Ra(3Pb), . . . , Ra(6Pb), 4 may be specified as the rhythmic beat-number N of the voice to be analyzed.

It is to be noted that the rhythmic beat-number specification section 58 may specify the rhythmic beat-number on the basis of the representative value of values of the power data of the time block associated with a number in which a difference between the i-th time block and a value i is smaller than or equal to a predetermined value. Here, for example, the representative value of the values of the power data of the time block associated with the number in which a difference between the i-th time block and the value i is smaller than or equal to the predetermined value is assumed to be expressed as Sa(i). Examples of a value of Sa(i) include a value S(i−1), a value S(i), a value S(i+1), an average thereof, a value S(i−2), a value S(i−1), a value S(i), an average thereof, and the like. In a case in which it is specified that respective values Sa(i) of a ta-th time block, (ta−Pb)-th time block, . . . , are compared with each other and the value of Sa(i) becomes great every four intervals, 4 may be specified as the rhythmic beat-number N.

Further, for example, the sound volume correlation value R(m×Pb) may be calculated every several integers. The beat timing of voices may be specified on the basis of the integer m associated with the maximum sound volume correlation value R and the integer m associated with the next maximum sound volume correlation value R among the above sound volume correlation values R(m×Pb).

In the present embodiment, for example, the rhythmic beat-number data storage section 60 stores rhythmic beat-number data indicating the rhythmic beat-number N specified by the rhythmic beat-number specification section 58. In the present embodiment, for example, the rhythmic beat-number data to which the rhythmic beat number N is set is stored in the rhythmic beat-number data storage section 60. In the present embodiment, the rhythmic beat-number specification section 58 updates a value of the rhythmic beat-number data whenever the rhythmic beat-number is specified.

In the present embodiment, for example, the measure start timing specification section 62 specifies start timing of a measure of the voice to be analyzed on the basis of the specified beat timing and the specified rhythmic beat-number.

Here, for example, the specified rhythmic beat-number N is assumed to be 4. In addition, it is assumed that 100 is specified as the value Pb of the beat cycle and 1980 is specified as the value ta of the latest beat timing. Here, the measure start timing specification section 62 calculates values of Sb(l) regarding respective integers l greater than or equal to 0 and smaller than n. Here, the value of Sb(l) is Sa(1980−100×l)+Sa(1980−100×(4+l)) + . . . +Sa(1980−100×(4×k3+l)). Note that k3 is a given integer and may be same with or different from the above-described integer k1 or k2. For example, the value of Sb(0) is Sa(1980)+Sa(1580)+ . . . +Sa(1980−400×k3). The value of Sb(1) is Sa(1880)+Sa(1480)+ . . . +Sa(1880−400×k3). The value of Sb(2) is Sa(1780)+Sa(1380)+ . . . +Sa(1780−400×k3). The value of Sb(3) is Sa(1680)+Sa(1280)+ . . . +Sa(1680−400×k3). Here, as described above, for example, Sa(1980) is the representative value of values of the power data of the time block associated with a number in which a difference between a 1980-th time block and a value 1980 is smaller than or equal to a predetermined value.

In a case in which a maximum value among a plurality of Sb(1) is Sb(2), a 1780-th time block is specified as the latest downbeat time block. In general, a first beat in a measure is a downbeat in many cases. Therefore, in the present embodiment, 1780 is assumed to be specified as a value tb of the latest measure start timing. In this manner, in the present embodiment, the value tb of the latest measure start timing is expressed by the number of the time block.

In the present embodiment, for example, the measure start timing data storage section 64 stores measure start timing data indicating the measure start timing specified by the measure start timing specification section 62. In the present embodiment, for example, the measure start timing data to which the value tb of the above-described latest measure start timing is set is stored in the measure start timing data storage section 64. In the present embodiment, the measure start timing specification section 62 updates the value tb of the measure start timing data whenever the latest measure start timing is specified.

In the present embodiment, for example, the key frame image data storage section 66 stores an image of a key frame in video data of displayed animations or the like. In the present embodiment, the image of the key frame is stored associated with the rhythmic beat-number. For example, the image of the key frame expressed by an appearance dancing to music of three beats is associated with the rhythmic beat-number of 3. In addition, for example, the image of the key frame expressed by an appearance dancing to music of four beats is associated with the rhythmic beat-number of 4.

In the present embodiment, for example, the video generation section 68 generates video data such as animations to be displayed. The video generation section 68 generates the video data, for example, on the basis of the value Pb of the beat cycle data, the value to of the beat timing data, the number N of the rhythmic beat-number data, and the value tb of the measure start timing data.

In the present embodiment, for example, in accordance with an instruction from the measure start timing specification section 62, the video generation section 68 decides a period that animation of one unit is displayed and generates video data including a frame image displayed in each frame belonging to the period.

The video generation section 68 associates the generated video data with time stamp data indicating displayed timing and allows the video storage section 70 to store the video data. Here, the time stamp data is, for example, data indicating a frame number, the number of the time block, a time from reproduction start timing of a video indicated by video data, and the like. Here, for example, a frame image associated with the time stamp data same with time stamp data associated with the frame image that has been previously stored in the video storage section 70 is assumed to be generated. In this case, the video generation section 68 may overwrite the frame image that has been stored in the video storage section 70 by using the generated frame image.

For example, it is assumed that a timing tp(1) prior to the latest measure start timing by a predetermined time Ta arrives. On this occasion, the video generation section 68 may hold a value tb+Pb×N at the timing tp(1) as a value tq(1) indicating start timing of the next animation.

Next, it is assumed that a timing tp(2) prior to the latest measure start timing by the predetermined time Ta arrives. On this occasion, the video generation section 68 may generate video data in a period from the start timing tq(1) at which a value is held to an end timing corresponding to the value tb+Pb×N at the timing tp(2). Further, at this time, the video generation section 68 may hold the value tb+Pb−N at the timing tp(2) as a value tq(2) indicating start timing of the next animation. Hereinafter, in a similar manner, an animation of one unit started from the start timing indicating the value tq may be generated. This permits smooth animations to be generated because the end timing of an animation of a certain one-unit and the start timing of an animation of the next one-unit become same timing.

It is to be noted that for example, in a case in which the timing tp(2) arrives, the video generation section 68 may generate video data in the period from the start timing corresponding to the value tb at the timing tp(2) to the end timing corresponding to the value tb+Pb×N at the timing tp(2). In addition, for example, in a case in which not the timing tp prior to the latest measure start timing by the predetermined time Ta but timing prior to timing corresponding to the value tq held as the start timing by the predetermined time Ta arrives, the video generation section 68 may generate video data.

For example, in a case in which the rhythmic beat-number N is 3, the video generation section 68 may generate video data on the basis of an image of the key frame expressed by an appearance dancing to music of three beats. In this case, for example, the image of the key frame may be used as the frame image of a frame corresponding to timing corresponding to the value tb, the value tb+Pb, the value tb+2Pb, and the value tb+3Pb. In addition, an image obtained by interpolating the previous or next key frame image may be used as the frame images of other frames. In a similar manner, for example, in a case in which the rhythmic beat-number N is 4, the video generation section 68 may generate video data on the basis of an image of the key frame expressed by an appearance dancing to music of four beats. In this case, for example, an image of the key frame may be used as the frame image of a frame corresponding to timing corresponding to the value tb, the value tb+Pb, the value tb+2Pb, the value tb+3Pb, and the value tb+4Pb. In addition, an image obtained by interpolating the previous or next key frame image may be used as the frame images of other frames.

The video storage section 70 stores the video data generated by the video generation section 68 as described above.

The video reproduction section 72 allows videos expressed by the video data stored in the video storage section 70 to be displayed. In the present embodiment, each frame image is displayed at timing indicated by the associated time stamp data.

The voice reproduction section 74 reproduces and outputs voices expressed by the voice data which the voice data acquisition section 40 acquires. In addition, the voice reproduction section 74 may output, for example, voices of hand-clapping or the like in accordance with timing at which the key frame image is displayed.

In the present embodiment, the video display according to the video reproduction section 72 and the reproduction output of voices according to the voice reproduction section 74 are synchronized with each other, and therefore videos such as animations matching with the voice to be analyzed are displayed.

Further, in the present embodiment, the start timing and the end timing of an animation of one unit to be reproduced in future are estimated on the basis of the value Pb of the beat cycle data, the value to of the beat timing data, the number N of the rhythmic beat-number data, and the value tb of the measure start timing data. Then, the video data in the period from the start timing to the end timing is generated. Therefore, in the present embodiment, videos according to voices expressed by the voice data in response to acquisition of the voice data can be generated in real time. Accordingly, for example, the voice analysis apparatus 10 according to the present embodiment, which receives voice data distributed by streaming, can allow videos matching with voices to be displayed in real time while voices expressed by the voice data are reproduced and output.

Figure 5:
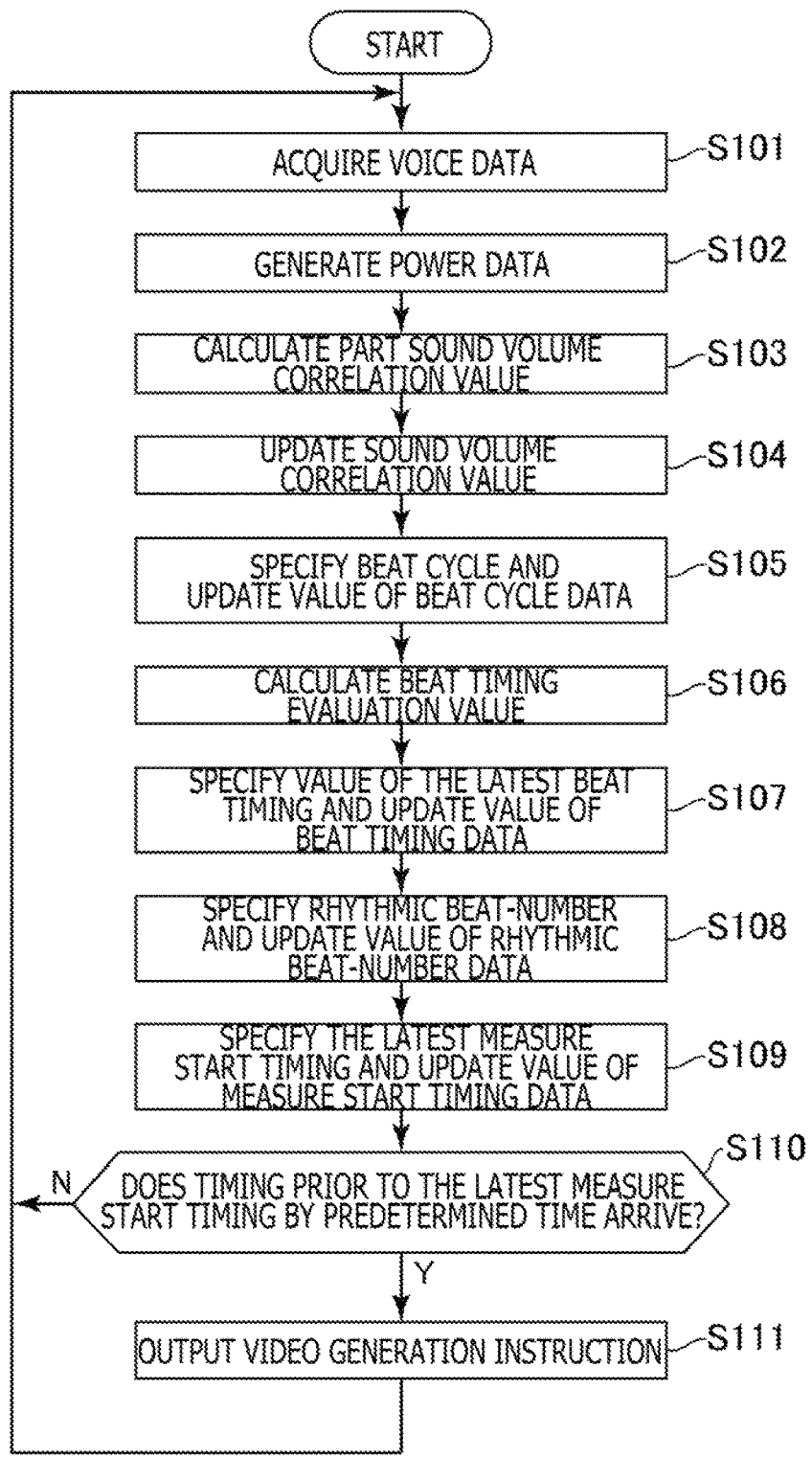
FIG. 5 is a flow chart illustrating an example of a stream of voice analysis processing that is executed in the voice analysis apparatus according to the embodiment of the present invention.

Hereinafter, an example of a stream of voice analysis processing, which is executed in the voice analysis apparatus 10 according to the present embodiment, will be described with reference to a flow chart illustrated in FIG. 5.

First, the voice data acquisition section 40 acquires voice data of a time block n to which the present time belongs (S101).

Then, the power data generation section 42 generates power data including a value S(n) indicating a sound volume of voices regarding the time block n (S102).

Then, the sound volume correlation value calculation section 48 calculates a part sound volume correlation value R(n, P) of the time block n (S103). Here, the part sound volume correlation value R(n, P) is calculated regarding respective integers greater than or equal to P0 and smaller than or equal to P1.

Then, the sound volume correlation value calculation section 48 updates the sound volume correlation value R(P) included in the sound volume correlation data stored in the sound volume correlation data storage section 46 on the basis of the calculated part sound volume correlation value R(n, P) regarding the respective integers greater than or equal to P0 and smaller than or equal to P1 (S104).

Then, the beat cycle specification section 50 specifies the value Pb of the beat cycle on the basis of the sound volume correlation data stored in the sound volume correlation data storage section 46 and updates a value of the beat cycle data stored in the beat cycle data storage section 52 to the specified value Pb (S105).

Then, the beat timing specification section 54 calculates the beat timing evaluation values Z(h) regarding respective integers h greater than or equal to 0 and smaller than Pb (S106).

Then, the beat timing specification section 54 specifies the value ta of the latest beat timing and updates a value of the beat timing data stored in the beat timing data storage section 56 to the specified value ta (S107).

Then, the rhythmic beat-number specification section 58 specifies the rhythmic beat-number N and updates a value of the rhythmic beat-number data stored in the rhythmic beat-number data storage section 60 to the specified rhythmic beat-number N (S108).

Then, the measure start timing specification section 62 specifies the value tb of the latest measure start timing and updates a value of the measure start timing data stored in the measure start timing data storage section 64 to the specified value tb (S109).

Then, the measure start timing specification section 62 confirms whether or not timing prior to the latest measure start timing by the predetermined time Ta arrives (S110). In a case in which it is here confirmed that the above timing arrives (S110: Y), the measure start timing specification section 62 outputs a video generation instruction to the video generation section 68 (S111). It is to be noted that as described above, in a case in which the timing prior to the timing tq(1) by the predetermined time Ta arrives, the video generation instruction may be output.

In a case in which the timing prior to the value tb of the latest measure start timing by the predetermined time Ta does not arrive (S110: N) or in a case in which the process illustrated in S111 ends, the process returns to the process illustrated in S101.

In this process example, the processes illustrated in S101 to S111 are repeatedly executed whenever the voice data of one time block is acquired.

Figure 6:
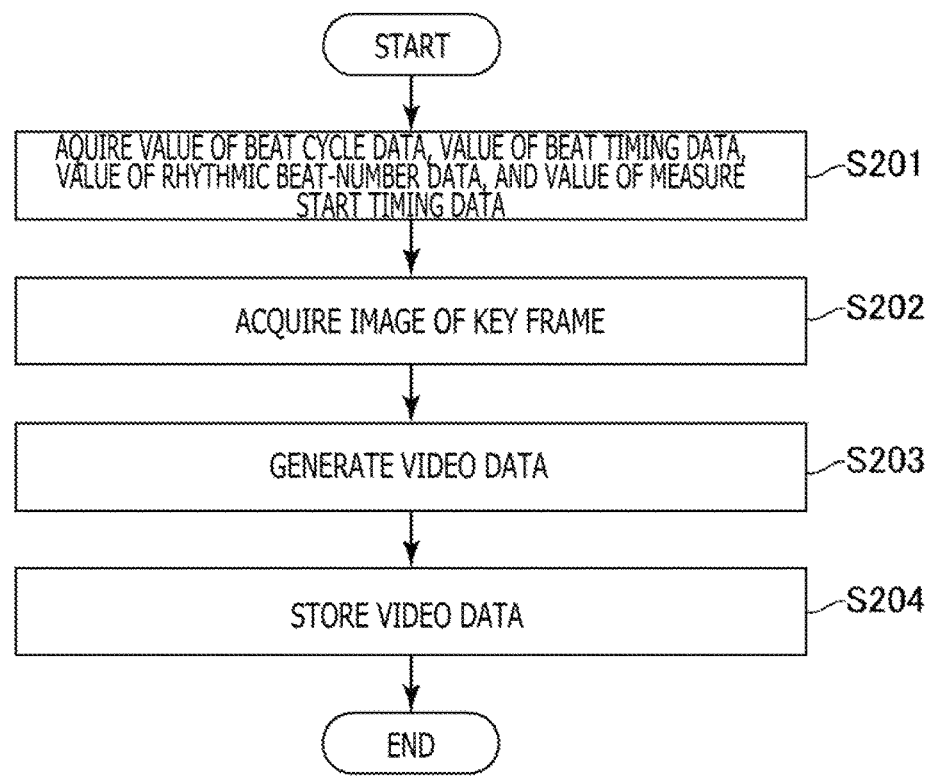
FIG. 6 is a flow chart illustrating an example of a stream of video generation processing that is executed in the voice analysis apparatus according to the embodiment of the present invention.

Hereinafter, an example of a stream of video generation processing that is executed in the voice analysis apparatus 10 according to the present embodiment will be described with reference to a flow chart illustrated in FIG. 6.

First, in accordance with reception of the video generation instruction from the measure start timing specification section 62, the video generation section 68 acquires the value Pb of the beat cycle data, the value ta of the beat timing data, the value N of the rhythmic beat-number data, and the value tb of the measure start timing data (S201). Here, for example, the value Pb of the beat cycle data stored in the beat cycle data storage section 52 is acquired. In addition, for example, the value ta of the beat timing data stored in the beat timing data storage section 56 is acquired. Further, for example, the value N of the rhythmic beat-number data stored in the rhythmic beat-number data storage section 60 is acquired. Further, for example, the value tb of the measure start timing data stored in the measure start timing data storage section 64 is acquired.

Then, the video generation section 68 acquires an image of the key frame stored in the key frame image data storage section 66 while being associated with the value N of the rhythmic beat-number data acquired in the process illustrated in S201 (S202).

Then, the video generation section 68 generates video data of an animation of one unit on the basis of the image of the key frame acquired in the process illustrated in S202 (S203).

Then, the video generation section 68 allows the video storage section 70 to store the video data generated in the process illustrated in S203 (S204).

Figure 7:
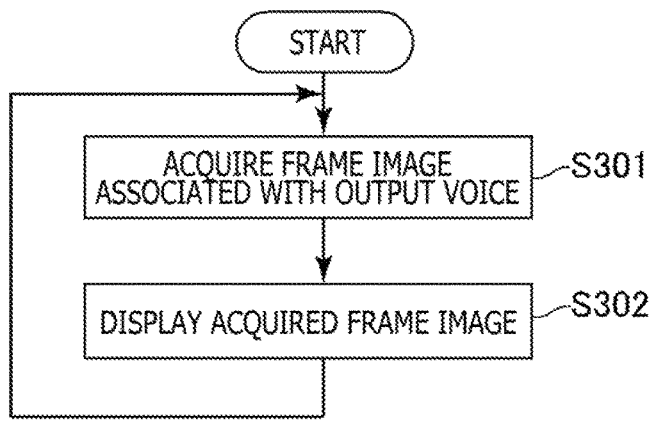
FIG. 7 is a flow chart illustrating an example of a stream of video reproduction processing that is executed in the voice analysis apparatus according to the embodiment of the present invention.

Hereinafter, an example of a stream of video reproduction processing that is executed in the voice analysis apparatus 10 according to the present embodiment will be described with reference to a flow chart illustrated in FIG. 7.

First, the video reproduction section 72 acquires the frame image that is associated with the time stamp data associated with output voices and is stored in the video storage section 70 (S301). Then, the video reproduction section 72 allows the frame image acquired in the process illustrated in S301 to be displayed (S302).

In this process example, the processes illustrated in S301 and S302 are repeatedly executed at a predetermined frame rate.

In this manner, according to the present embodiment, voices to be output and videos to be displayed are synchronized with each other.

Note that the present invention is not limited to the above-described embodiment.

For example, the sound volume correlation value calculation section 48 may reset a value of the sound volume correlation data stored in the sound volume correlation data storage section 46 at the time at which a predetermined time elapses in a state in which the sound volume of voices expressed by the voice data is smaller than a predetermined sound volume. For example, all values of the sound volume correlation values R(P0), R(P0+1), R(P1) may be updated to 0. It is sometimes necessary that a beat may be newly detected depending on music, for example, a medley performance which is changing a beat on the way of playing. When a value of power data is reset in this manner, voices in a front portion in which a beat is changed or voices in a previous number can suppress its influence exerted on results of voice analysis.

Further, for example, two threads in which the processes illustrated in the above-described S101 to S111 are executed may be carried out. Then, in a first thread, power data generated by the power data generation section 42 may be directly used, and in a second thread, power data in which a value is 0 may be used prior to certain timing. Then, in a case in which a difference in analysis results according to two threads is greater than a predetermined difference, analysis results of the second thread may be used, and in a case in which the difference in the analysis results is not greater than the predetermined difference, the analysis results of the first thread may be used.

Further, for example, generation of videos expressed by the video data stored in the video storage section 70 or that of voices expressed by the voice data to be analyzed may be performed by an apparatus separate from the voice analysis apparatus 10. For example, the voice analysis, apparatus 10 may provide the video data associated with the time stamp data and the voice data which the voice data acquisition section 40 acquires to the separate apparatus. Further, reproduction of the videos synchronized with the voices may be performed by using the separate apparatus.

Further, the above-described specific character strings or values and specific character strings or values in the drawings are illustrative and not limited to these character strings or values.

The invention claimed is:

1. A voice analysis apparatus comprising:
   a sound volume correlation value calculation section configured to calculate, for each of a plurality of time intervals, a value indicating a degree of correlation in a sound volume of voices at two or more timings separated by the time interval, as a sound volume correlation value associated with the time interval; and
   a beat cycle specification section configured to specify a beat cycle of the voices on a basis of the sound volume correlation value associated with each of the plurality of time intervals,
   a rhythmic beat-number specification section configured to specify, for each of a plurality of integers, the sound volume correlation value associated with the time interval that is the integer multiple of the beat cycle and specify a rhythmic beat-number of the voices on the basis of the specified sound volume correlation value; and
   a video generating section to generate and display a video based on the beat cycle and the rhythmic beat-number of the voices.

2. The voice analysis apparatus according to claim 1, wherein
   the sound volume correlation value calculation section calculates a representative value of the value indicating the degree of the correlation in the sound volume of the voices at the two or more timings separated by the time interval, which is calculated for each of a plurality of timings and includes the timing, as the sound volume correlation value associated with the time interval.

3. The voice analysis apparatus according to claim 1, further comprising
   a beat timing specification section configured to calculate, for each of the plurality of timings, the value indicating the degree of the correlation in the sound volume of the voices at the two or more timings separated by the beat cycle, which includes the timing and the sound volume of the voices at the timing, and specify a beat timing of the voices on the basis of the calculated value.

4. A voice analysis method comprising:
   calculating, for each of a plurality of time intervals, a value indicating a degree of correlation in a sound volume of voices at two or more timings separated by the time interval, as a sound volume correlation value associated with the time interval;
   specifying a beat cycle of the voices on a basis of the sound volume correlation value associated with each of the plurality of time intervals;
   specifying, for each of a plurality of integers, the sound volume correlation value associated with the time interval that is the integer multiple of the beat cycle and specify a rhythmic beat-number of the voices on the basis of the specified sound volume correlation value; and
   a video generating section to generate and display a video based on the beat cycle and the rhythmic beat-number of the voices.

5. A non-transitory computer readable medium having stored thereon a program for a computer, the program comprising:
   calculating for each of a plurality of time intervals, a value indicating a degree of correlation in a sound volume of voices at two or more timings separated by the time interval, as a sound volume correlation value associated with the time interval by a sound volume correlation value calculation section;
   specifying a beat cycle of the voices on a basis of the sound volume correlation value associated with each of the plurality of time intervals by a beat cycle specification section;
   specifying, for each of a plurality of integers, the sound volume correlation value associated with the time interval that is the integer multiple of the beat cycle and specify a rhythmic beat-number of the voices on the basis of the specified sound volume correlation value; and
   a video generating section to generate and display a video based on the beat cycle and the rhythmic beat-number of the voices.

6. A voice analysis apparatus comprising:
   a sound volume correlation value calculation section configured to calculate, for each of a plurality of time intervals, a value indicating a degree of correlation in a sound volume of voices at two or more timings separated by the time interval, as a sound volume correlation value associated with the time interval;

a beat cycle specification section configured to specify a beat cycle of the voices on a basis of the sound volume correlation value associated with each of the plurality of time intervals;

a beat timing specification section configured to calculate, for each of the plurality of timings, the value indicating the degree of the correlation in the sound volume of the voices at the two or more timings separated by the beat cycle, which includes the timing and the sound volume of the voices at the timing, and specify a beat timing of the voices on the basis of the calculated value;

a rhythmic beat-number specification section configured to specify, for each of a plurality of integers, the sound volume correlation value associated with the time interval that is the integer multiple of the beat cycle and specify a rhythmic beat-number of the voices on the basis of the calculated sound volume correlation value;

a measure start timing specification section configured to specify a measure start timing of the voices on the basis of the specified beat timing and the specified rhythmic beat-number; and a video generating section to generate and display a video based on the beat cycle, and the rhythmic beat-number of the voices, and the measure start timing.

* * * * *